(12) United States Patent
Miyano

(10) Patent No.: US 8,971,613 B2
(45) Date of Patent: Mar. 3, 2015

(54) IMAGE PROCESSING LEARNING DEVICE, IMAGE PROCESSING LEARNING METHOD, AND IMAGE PROCESSING LEARNING PROGRAM

(75) Inventor: Hiroyoshi Miyano, Tokyo (JP)

(73) Assignee: NEC Corporation, Tokyo (JP)

( * ) Notice: Subject to any disclaimer, the term of this patent is extended or adjusted under 35 U.S.C. 154(b) by 121 days.

(21) Appl. No.: 13/808,511

(22) PCT Filed: May 24, 2011

(86) PCT No.: PCT/JP2011/062310
§ 371 (c)(1),
(2), (4) Date: Jan. 4, 2013

(87) PCT Pub. No.: WO2012/005066
PCT Pub. Date: Jan. 12, 2012

(65) Prior Publication Data
US 2013/0108154 A1    May 2, 2013

(30) Foreign Application Priority Data

Jul. 7, 2010    (JP) .................................. 2010-154914

(51) Int. Cl.
G06K 9/62    (2006.01)
G06K 9/00    (2006.01)
G06K 9/66    (2006.01)
G06T 7/00    (2006.01)

(52) U.S. Cl.
CPC .......... *G06K 9/00228* (2013.01); *G06K 9/6214* (2013.01); *G06K 9/66* (2013.01); *G06T 7/0044* (2013.01); *G06K 9/00241* (2013.01); *G06K 9/6259* (2013.01); *G06T 2207/20081* (2013.01); *G06T 2207/20084* (2013.01); *G06T 2207/30201* (2013.01)

USPC .......................................................... 382/159

(58) Field of Classification Search
None
See application file for complete search history.

(56) References Cited

U.S. PATENT DOCUMENTS 7,155,037 B2 * 12/2006 Nagai et al. .................... 382/118
8,219,438 B1 * 7/2012 Moon et al. ................... 705/7.29
8,355,602 B2 * 1/2013 Yamazaki et al. ............. 382/298

(Continued)

FOREIGN PATENT DOCUMENTS

JP    2001-291108 A    10/2001
JP    2004-094491 A    3/2004

(Continued)

OTHER PUBLICATIONS

Paul Viola, et al., "Rapid Object Detection using a Boosted Cascade of Simple Features", Computer Vision and Pattern Recognition, 2001, pp. I-9.

Margarita Osadchy, et al., "Synergistic Face Detection and Pose Estimation with Energy-Based Models", Journal of Machine Learning Research 8, 2007, pp. 1197-1215, vol. 8.

*Primary Examiner* — Daniel Mariam
(74) *Attorney, Agent, or Firm* — Sughrue Mion, PLLC

(57) ABSTRACT

Disclosed is an image processing learning device with which face direction estimation processing and face detection processing can be executed simultaneously and with high precision without incurring significant costs. The image processing learning device comprises: a face direction identification unit, a position estimation unit, a face identification unit, a first update quantity calculation unit, a second update quantity calculation unit, and a parameter update unit.

11 Claims, 10 Drawing Sheets

(56) References Cited

U.S. PATENT DOCUMENTS

2005/0234324 A1 10/2005 Sugimoto
2007/0196019 A1 8/2007 Yamaguchi
2011/0075933 A1* 3/2011 Hong et al. ............... 382/190

FOREIGN PATENT DOCUMENTS

| JP | 2005-285035 A | 10/2005 |
|---|---|---|
| JP | 2006-018706 A | 1/2006 |
| JP | 2007-226512 A | 9/2007 |

* cited by examiner

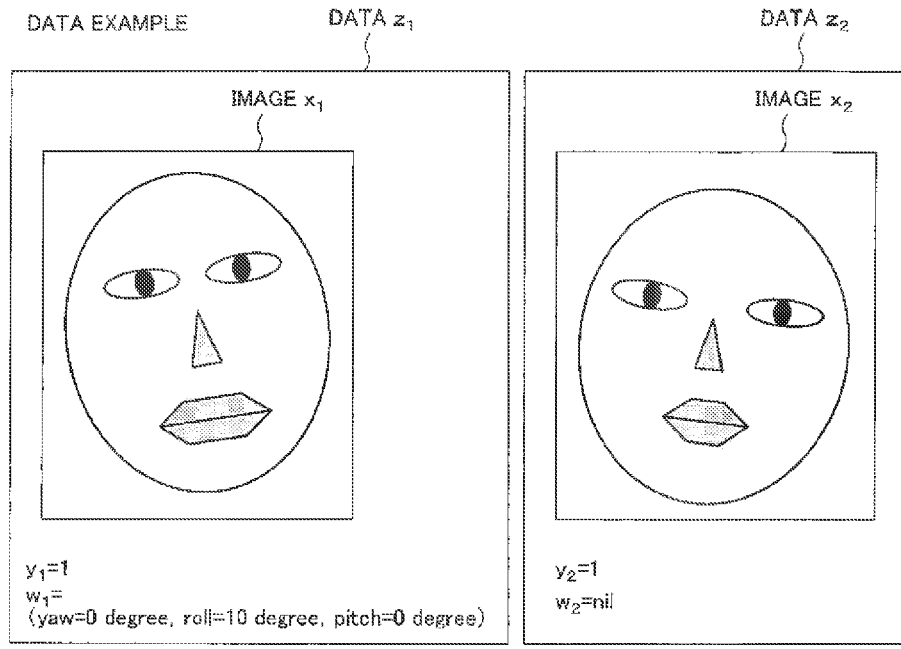
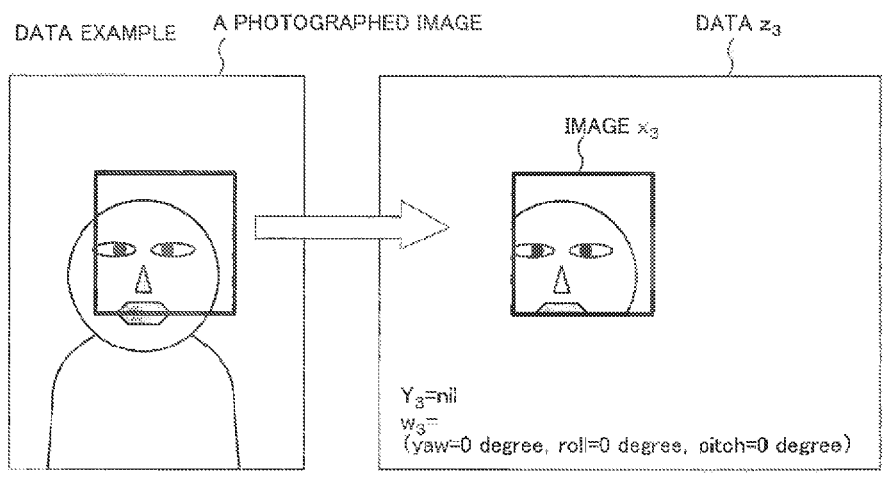

IMAGE PROCESSING LEARNING DEVICE, IMAGE PROCESSING LEARNING METHOD, AND IMAGE PROCESSING LEARNING PROGRAM

CROSS REFERENCE TO RELATED APPLICATIONS

This application is a National Stage of International Application No. PCT/JP2011/062310 filed May 24, 2011, claiming priority based on Japanese Patent Application No. 2010-154914 filed Jul. 7, 2010, the contents of all of which are incorporated herein by reference in their entirety.

FIELD OF THE INVENTION

The present invention relates to an image processing learning device, an image processing learning method and an image processing learning program.

BACKGROUND OF THE INVENTION

As a technology which estimates a direction of a face in an image and which is related to the present invention, there are technologies described in patent document 1 and patent document 2, for example.

For example, a face direction estimation processing technology described in patent document 1 acquires frontal-face data of a plurality of people in advance, creates an average face, posts the average face onto a three-dimensional model, and generates an image by rotating by optional inclined angles. The face direction estimation technology described in patent document 1 estimates the direction of a face of an input image by using determination of an image of an inclined angle that has the highest correlation degree with the input image. The face direction estimation technology described in patent document 1 premises that an input image is a facial image. Patent document 2 also takes this premise similarly.

As above, in a face direction estimation technology, whether an input image is a facial image or not is judged in advance in many cases. Judgment of whether an input image is a facial image or not is performed based on detecting a face in an input image using a face detection technique described in non-patent document 1, for example.

Various facial detection techniques such as one seen in non-patent document 1 extract an area of a face from a whole image for which detection of a face is desired. Specifically, the facial detection techniques extract various partial images from a whole image. Next, the facial detection techniques judge whether an extracted partial image is an image in which a face shows up mainly or an image that is not such one. Then, the facial detection techniques judge an area corresponding to an image which has been determined as an image in which a face shows up mainly as an area where a face exists.

Further, hereinafter, "an image on which a face shows up mainly" is called a facial image and "an image that is not so" is called non-facial image for convenience of description.

Technologies described in such as non-patent document 1 learn processing for detecting a face after a lot of facial image groups and non-facial image groups have been prepared in advance. For example, a facial image group used for learning is acquired by designating an area where a face exists from an image including the face based on manpower and clipping the area.

As the case with the above-mentioned patent document 1, many of face direction estimation technologies premise that facial detection processing has been performed using the related facial detection techniques or the like. That is, in many cases, a face direction estimation technology and a facial detection technique are independent technologies. In many cases, a face direction estimation technology premises that whether an image of an estimation target is a facial image or a non-facial image is already known. On the other hand, a facial detection technique premises that the direction of a face in an image of a detection target is known roughly.

Here, the technology described in non-patent document 2 improves accuracy of the both processing not by performing a face direction estimation processing and a facial detection processing as individual, but by performing simultaneously.

The technology described in non-patent document 2 prepares a great deal of facial image groups and non-facial image groups in advance. About each image of each prepared image group, the technology described in non-patent document 2 gives information whether it is a facial image or not and, if it is a facial image, information in which direction it faces together in advance. Then, the technology described in non-patent document 2 learns facial detection processing and face direction estimation processing simultaneously using data made by integrating each image and its information. Therefore, the technology described in non-patent document 2 can perform facial detection processing and face direction estimation processing simultaneously and with a high degree of accuracy.

PRIOR ART DOCUMENTS

[Patent document 1] Japanese Patent Application Laid-Open No. 2001-291108
[Patent document 2] Japanese Patent Application Laid-Open No. 2004-094491
[Non-patent document 1] P. Viola and M. Jones, "Rapid Object Detection using a Boosted Cascade of Simple Features," Computer Vision and Pattern Recognition, 2001.
[Non-patent document 2] M. Osadchy, Matthew L. Miller and Y. L. Cun, "Synergistic Face Detection and Pose Estimation with Energy-Based Models," Journal of Machine Learning Research, 2007.
[Non-patent document 3] C. M. Bishop (Author), Hiroshi Motoda/Takio Kurita/Tomoyuki Higuchi/Hiroji Matsumoto/Noboru Murata (Translation Supervisors), pp. 270-272, "Pattern Recognition and Machine Learning" (Vol. 1), 2007.
[Non-patent document 4] C. M. Bishop (Author), Hiroshi Motoda/Takio Kurita/Tomoyuki Higuchi/Hiroji Matsumoto/Noboru Murata (Translation Supervisors), pp. 226-238, "Pattern Recognition and Machine Learning" (Vol. 1), 2007.

SUMMARY OF THE INVENTION

Problems to be Solved by the Invention

In the technology described in non-patent document 2, face information and, if it is a facial image, information on which direction a face is facing need to be given together to all images prepared in advance.

However, actually, it is difficult to give face information and face direction information simultaneously to all images. Because, the process by which face information is given and the process by which face direction information is given are completely different.

Face information can be obtained from collected images including a face by clipping an area of a face one by one using manpower. On the other hand, regarding face direction information, its correct numerical value can be obtained based on fixing the positions of a camera and an object for photographing in advance of photographing/extracting an image by the camera or the like, and on measuring their positional relationship. Conversely, correct face direction information cannot be obtained from facial images photographed without grasping correct numerical values (facial images photographed in a state that the positions of a camera and an object for photographing are not known, a great amount of which can be collected easily in the web and the like, for example).

If the positions of a camera and an object for photographing are measured in advance at the time of photographing, a lot of images for which face direction information has been grasped can be obtained easily by massively photographing images by the camera after that. However, work for designating a facial area in order to clip facial images appropriately from the photographed images needs manpower for each one image, and thus it costs significantly.

Therefore, in a practical aspect, it is difficult to collect a lot of images which hold face direction information and face information simultaneously.

Further, in non-patent document 2, there is simple citation that, when face direction information is unknown, it should be learned using a result of estimating direction of a face. However, it has no detailed description about a learning method.

Therefore, an object of the present invention is to provide a technology in which, even when face information and, if it is a facial image, information about which direction a face is facing are not given simultaneously to all of images prepared in advance, face direction estimation processing and facial detection processing can be learned simultaneously and with a high degree of accuracy without significant cost.

Means for Solving the Problem

In order to achieve the above-mentioned object, an image processing learning device in the present invention comprises: a face direction information identification unit for identifying whether a face direction being known or unknown about data selected from a learning data group; a manifold position conversion unit for converting information about a face direction into a position on a manifold, upon a face direction being identified as being known by the face direction information identification unit; a manifold position estimation unit for estimating which position on the manifold being a suitable position from a position on a space of converted image using a function of converting the image corresponding to said data into a position on the space embedding said manifold, upon a face direction being identified as being unknown by said face direction information identification means; a face information identification unit for identifying whether being known or unknown whether the data being a facial image or a non-facial image; a first parameter update quantity calculation unit for calculating a distance between a position on a manifold converted by the manifold position conversion unit or estimated by the manifold position estimation unit and a position of the image on the space converted using the function, and calculating an update quantity of a parameter included in the function according to whether being a facial image or being a non-facial image based on said distance, upon being identified by the face information identification unit as being known whether being a facial image or being a non-facial image; a second parameter update quantity calculation unit for calculating an update quantity of the parameter in a manner, upon a distance between a position on a manifold converted by the manifold position conversion unit or estimated by the manifold position estimation unit and a position of the image on the space being short, further shortening the distance, and, upon the distance being large, further enlarging the distance, upon being identified by said face information identification means as being unknown whether being a facial image or being a non-facial image; and a parameter update unit for updating the parameter using an update quantity calculated by the first parameter update quantity calculation unit or the second parameter update quantity calculation unit.

In order to achieve the above-mentioned object, an image processing learning method in the present invention comprises: identifying whether a face direction being known or unknown about data selected from a learning data group; converting information about a face direction into a position on a manifold, upon a face direction being identified as being known; estimating which position on the manifold being a suitable position from a position on a space of converted image using a function of converting the image corresponding to said data into a position on the space embedding said manifold, upon identifying a face direction as being unknown; identifying whether being known or unknown whether the data being a facial image or a non-facial image; calculating a distance between a position on a manifold converted or estimated and a position of the image on the space converted using the function, and calculating an update quantity of a parameter included in the function according to whether being a facial image or being a non-facial image based on the distance, upon being identified as being known whether being a facial image or being a non-facial image; calculating an update quantity of the parameter in a manner, upon a distance between the converted or the estimated position on a manifold and a position of the image on the space being short, further shortening the distance, and, upon the distance being large, further enlarging the distance, upon being identified as being unknown whether being a facial image or being a non-facial image; and updating the parameter using the calculated update quantity.

In order to achieve the above-mentioned object, an image processing learning program in the present invention makes a computer carry out processing of: identifying whether a face direction being known or unknown about data selected from a learning data group; converting information about a face direction into a position on a manifold, upon a face direction being identified as being known; estimating which position on the manifold being a suitable position from a position on a space of converted image using a function of converting the image corresponding to the said data into a position on the space embedding said manifold, upon identifying a face direction as being unknown; identifying whether being known or unknown whether the data being a facial image or a non-facial image; calculating a distance between a position on a manifold converted or estimated and a position of the image on the space converted using the function, and calculating an update quantity of a parameter included in the function according to whether being a facial image or being a non-facial image based on the distance, upon being identified as being known whether being a facial image or being a non-facial image; calculating an update quantity of the parameter in a manner, upon a distance between the converted or the estimated position on a manifold and a position of the image on the space being short, further shortening the distance, and, upon the distance being large, further enlarging the distance, upon being identified as the being unknown whether being a facial image or being a non-facial image; and updating the parameter using the calculated update quantity.

Effect of the Invention

According to an image processing learning device in the present invention, even when face information and, if it is a facial image, information about which direction a face is facing are not given simultaneously to all images prepared in advance, face direction estimation processing and facial detection processing can be learned simultaneously and with a high degree of accuracy without significant cost.

EXEMPLARY EMBODIMENT OF THE INVENTION

The First Exemplary Embodiment

Figure 1:
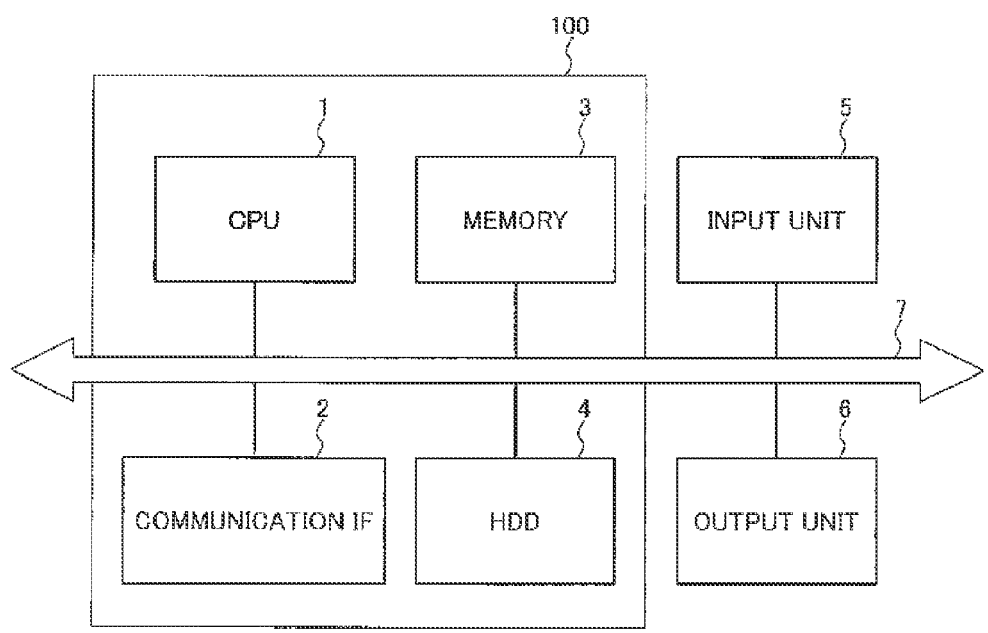
FIG. 1 A hardware block diagram of an image processing learning device 100 in a first exemplary embodiment of the present invention FIG. 2 A block diagram showing a functional structure of the image processing learning device 100 in the first exemplary embodiment of the present invention FIG. 3 A diagram showing an example of learning data FIG. 4 A diagram showing another example of learning data FIG. 5 A diagram showing an image of obtaining a position p on a manifold from face direction information wj FIG. 6 A diagram showing a method by which a manifold position estimation unit estimates a position on a manifold from learning data whose face direction is unknown FIG. 7 A diagram showing update of a face direction estimation parameter for learning data which is already known as being a facial image FIG. 8 A diagram showing update of a face direction estimation parameter for learning data which is already known as being a non-facial image FIG. 9 A diagram showing update of a face direction estimation parameter for learning data which is unknown whether it is a facial image or a non-facial image FIG. 10 A flowchart showing operations of the first exemplary embodiment of the present invention FIG. 11 A block diagram showing a functional structure of an image processing apparatus according to a second exemplary embodiment of the present invention FIG. 12 A flowchart showing operations of the second exemplary embodiment of the present invention FIG. 13 A diagram showing an example of a neural network which converts an image into a manifold

FIG. 1 is a hardware structure diagram of the image processing learning device 100 of the first exemplary embodiment of the present invention. As shown in FIG. 1, the image processing learning device 100 includes a CPU (central processing unit) 1, a communication interface (IF) 2, a memory 3 and a HDD (hard disk drive) 4. These components are connected with each other via a bus 7 together with an input unit 5 and an output unit 6, and perform input and output of data. The communication IF 2 is an interface for connecting to an external network. The input unit 5 is a keyboard and a mouse, for example. The output unit 6 is a display or the like. The image processing learning device 100 is realized based on the CPU 1 executing a program stored in a storage medium such as the memory 3 or the HDD 4.

Figure 2:
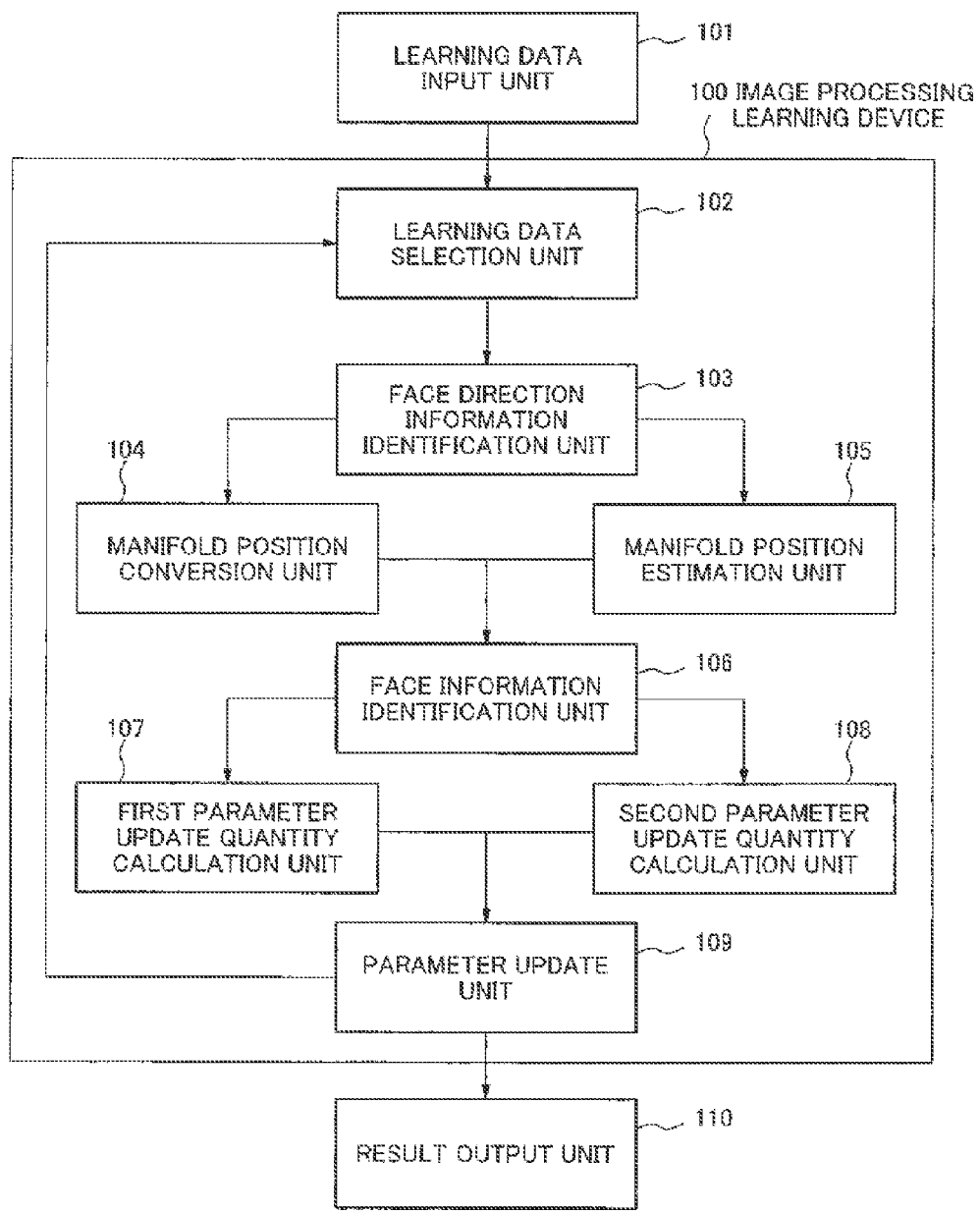

FIG. 2 is a block diagram showing a functional structure of the image processing learning device 100 of the first exemplary embodiment of the present invention. As shown in FIG. 2, the image processing learning device 100 includes a learning data selection unit 102, a face direction information identification unit 103, a manifold position conversion unit 104, a manifold position estimation unit 105, a face information identification unit 106, a first parameter update quantity calculation unit 107, a second parameter update quantity calculation unit 108 and a parameter update unit 109. And, the image processing learning device 100 is connected with a learning data input unit 101 and a result output unit 110.

The learning data input unit 101 inputs a great deal of learning data groups for making learning of facial detection processing and face direction estimation processing be carried out. And, in order to output an inputted learning data group to the bus 7 shown in FIG. 1 or to the learning data selection unit 102, for example, the learning data input unit 101 may have a function to store it temporarily. The learning data input unit 101 may read out a learning data group stored in a storage medium such as the memory 3 or the HDD 4 and input it. Or, the learning data input means 101 may input a learning data group based on information that is generated by a user operating the input unit 5. Or, the learning data input unit 101 may input by receiving a learning data group from the internet through the communication IF 2 of FIG. 1.

A learning data group is a data group constituted with information described below. One of information of learning data is a single piece of facial image information or single piece of non-facial image information. And, one of information of learning data is face information. Here, the face information is information which shows whether an image is a facial image, a non-facial image, or unclear in which. And, one of information of learning data is face direction information. The face direction information is information related to which direction the face is facing if it is an image of a face. Learning data is constructed by a combination of image information, face information and face direction information mentioned above.

Hereinafter, it is supposed that there are N pieces of learning data in a learning data group to be inputted, and the respective pieces of the learning data are expressed as zi (where, i=1, 2, 3, . . . , N). Zi includes image information xi, face information yi and face direction information wi.

For example, regarding xi, if an image is a monochrome image of 32 pixels in height and 32 pixels in width, x may be a vector of 32×32 dimensions made by arranging gray scale values in the 32×32 locations.

Or, about yi, yi may be given "1" when xi is a facial image, "−1" when it is a non-facial image, and a symbol of "nil" when it is unclear in which, respectively.

And, about wi, when there is information on inclined angles of a face direction (yaw (a rotation angle about Y axis), roll (a rotation angle about Z axis) and pitch (a rotation angle about X axis)), that information may be given to it, and when not so, a symbol of "nil" may be given. A setting standard of an angle of a face direction may be set by a predetermined standard, however, it may be set such that the state that a face in an image faces front as yaw="0" degree, roll="0" degree and pitch="0" degree.

FIG. 3 is a diagram showing an example of learning data which the learning data input unit 101 inputs. Z1 shown in FIG. 3 is an example including facial image information x1, face information y1 (=1) which indicates the image is a facial image and face direction information w1 (information of yaw=0 degree, roll=10 degree and pitch=0 degree). That is, z1 is data which is known as a facial image, and for which a face direction is known. Z2 shown in FIG. 3 is an example including facial image information x2, information of face information y2 (=1) which indicates the image is a facial image, and w2 (="nil") which shows that the face direction is unknown. That is, z2 is data which is known as a facial image, but whose face direction is unknown. A facial image which is included in a learning data group to be inputted at the time of learning may use a facial image designated a face area and clipped by manpower. FIG. 4 is a diagram showing an example of such learning data. A learning data z3 shown in FIG. 4 is an example including: facial image information x3 clipped a part from a photographed image A, information y3 (="nil") which indicates the image is not clear whether a facial image or a non-facial image, and a face direction information w3=(information of yaw=0 degree, roll=0 degree and pitch=0 degree). Such image is obtained by selecting and clipping an area randomly or mechanically because the position of the face is not known when it is known that a face facing front has been photographed by measuring the photographing environment in advance.

Facial image information which is included in a learning data group inputted at the time of learning may be information for which, for example, an image detected based on the technology described in non-patent document 1 is employed as a facial image, in the first half of learning. In this case, in the second half of learning, such facial image information may be utilized as data for which whether it is a facial image or not is unknown.

In addition, facial detection techniques mounted on a digital camera or the like in recent years detects a face facing front mainly. Therefore, facial image information included in a learning data group may be facial image information which has been processed using facial detection processing mounted on a digital camera and is a frontal face direction to which facial detection has been successfully performed. In the second half of learning, it may be utilized again as data whose face direction is unknown.

The learning data selection unit 102 selects one piece of learning data zj (j is a number optionally selected from i=1, 2, 3, ..., N) from learning data zi in a learning data group inputted by the above-mentioned learning data input unit 101, and outputs the selected data zj. The learning data selection unit 102 may select learning data zj from the N pieces of learning data at random. Or, the learning data selection unit 102 may set or hold different choice probability values about each value of yj and wj in advance, and select learning data zj according to the choice probability values. For example, the learning data selection unit 102 may select learning data zj of yj=1 by priority. Or, the learning data selection unit 102 may select learning data in which yi is yj=1 and wj is not "nil" by priority. Or, the learning data selection unit 102 may select data in which a face direction is known and whether it is a facial image or a non-facial image is known by priority in the early stage of learning limitedly.

The face direction information identification unit 103 identifies whether a face direction is known or unknown about data zj selected by the learning data selection unit 102. Specifically, the face direction information identification unit 103 may detect face direction information wj in zj, identify whether "nil" is given to wj or not, and, if one except for "nil" is given, output information of determination that a face direction is known. Further, when face information yj in data zj is "−1", the face direction information identification unit 103 may identify that image information xj is information on a non-facial image, and, further, output information of determination that a face direction is unknown without referring to wj.

The manifold position conversion unit 104 converts face direction information wj into information of a position on a manifold that expresses a face direction set in advance based on information which is outputted when a face direction is identified as being known by the face direction information identification unit 103, and outputs it. Specifically, for example, as described in non-patent document 2, the manifold position conversion unit 104 may convert a position on the manifold as p into p=F (wj) by a function F for converting face direction information wj into position p specified in advance. Here, function F may be a function identical with one disclosed in non-patent document 2, but not limited to this.

Figure 5:
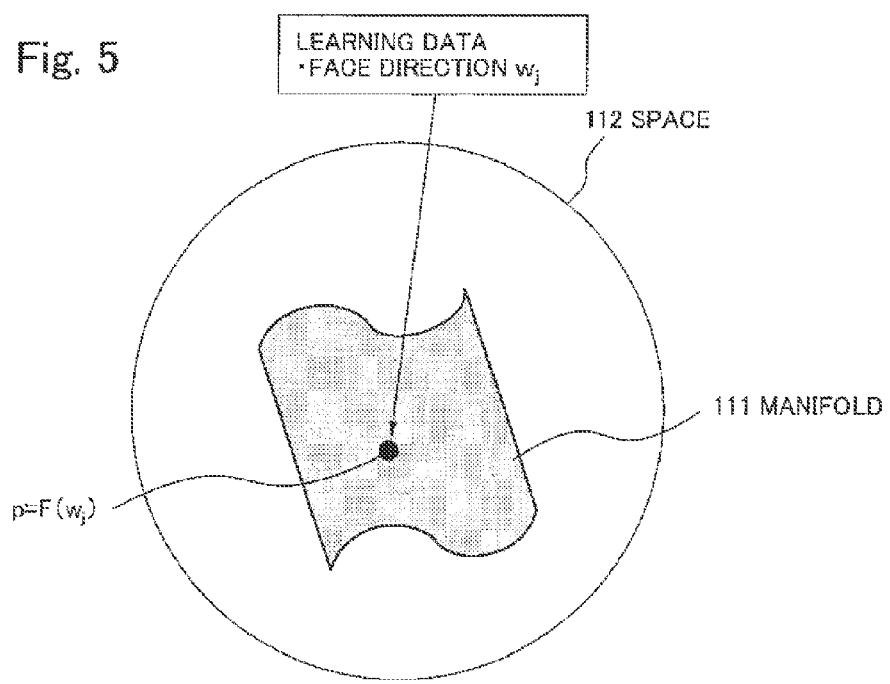

FIG. 5 is a diagram showing an image of obtaining position p on a manifold 111 from face direction information wj. In FIG. 5, the space 112 is defined as a space into which embeds the manifold 111.

Temporarily, yaw is considered as a face direction. In this case, a function for converting wj into a position on the manifold 111 may be defined by function F indicated in Formula 1 as described in non-patent document 2.

$$F_k(w) = \cos(\theta - \alpha_k), k = 1, 2, 3; \alpha = \{-\frac{\pi}{3}, 0, \frac{\pi}{3}\} \quad \text{(Formula 1)}$$

θ is yaw. In this case, a manifold representing a face direction expressed in F (w) is a manifold embedded in a three-dimensional space.

Also, temporarily, yaw and roll is considered as a face direction. In this case, a function for converting wj into a position on a manifold may be defined by function F indicated in Formula 2 as yaw is θ and roll is φ.

$$F_{kl}(w) = \cos(\theta - \alpha_k)\cos(\phi - \beta_l), k, l = 1, 2, 3; \quad \text{(Formula 2)}$$

$$\alpha = \{-\frac{\pi}{3}, 0, \frac{\pi}{3}\}, \beta = \{-\frac{\pi}{3}, 0, \frac{\pi}{3}\}$$

In this case, a manifold representing a face direction expressed in F (w) is a manifold embedded in a 9 dimensional space.

Also, temporarily, yaw, roll and pitch are considered as a face direction. In this case, a manifold representing a face direction may be defined by function F indicated in Formula 3 as yaw is θ, roll is φ and pitch is ψ.

$$F_{klm}(w) = \cos(\theta - \alpha_k)\cos(\phi - \beta_l)\cos(\varphi - \gamma_m), \quad \text{(Formula 3)}$$

$$k, l, m = 1, 2, 3;$$

$$\alpha = \{-\frac{\pi}{3}, 0, \frac{\pi}{3}\}, \beta = \{-\frac{\pi}{3}, 0, \frac{\pi}{3}\}, \gamma = \{-\frac{\pi}{3}, 0, \frac{\pi}{3}\}$$

In this case, a manifold representing a face direction expressed in F (w) is manifold embedded in a 27 dimensional space.

Further, the number of dimensions of a manifold may be increased as expressed in Formula 4, for example.

$$k, l, m = 1, 2, 3, 4, 5; \alpha = \{-\frac{\pi}{2}, -\frac{\pi}{3}, 0, \frac{\pi}{3}, \frac{\pi}{2}\}, \quad \text{(Formula 4)}$$

$$\beta = \{-\frac{\pi}{2}, -\frac{\pi}{3}, 0, \frac{\pi}{3}, \frac{\pi}{2}\}, \gamma = \{-\frac{\pi}{2}, -\frac{\pi}{3}, 0, \frac{\pi}{3}, \frac{\pi}{2}\}$$

In this case, a manifold representing a face direction expressed in F (w) of Formula 3 is a manifold embedded in a 125 dimensional space. And, a manifold representing a face direction expressed in F (w) of Formula 1 is a manifold embedded in a 5 dimensional space, and a manifold representing a face direction expressed in F (w) of Formula 2 is a manifold embedded in a 25 dimensional space.

The manifold position estimation unit 105 estimates which point on the manifold 111 representing a predetermined face direction is a suitable point from a position of image information xj on the space 112 converted by a function which converts the image related to the learning data into a position on the space 112 embedding the above-mentioned manifold 111, based on information which is outputted when a face direction is identified as being unknown by a face direction information identification means 103.

Specifically, apart from function F, the manifold position estimation unit 105 prepares the function G (xj) which converts image information xj into a position on the space 112 embedding the manifold 111. Function G is constructed with one parameter or a plurality of parameters. Hereinafter, this parameter is defined as λ. In non-patent document 2, G (xj) is a convolution neural network (hereinafter, CNN) which is also disclosed in non-patent document 3. In this case, λ is a weight parameter of CNN. Here, function G (xj) may be a function identical with the functions disclosed in non-patent document 2 and non-patent document 3, but not limited to this.

The manifold position estimation unit 105 performs conversion of image information xj to another vector vj as vj=G (xj) by function G (xj). The manifold position estimation unit 105 calculates p that is the closest position to vj among positions on the manifold 111 expressing a face direction using Formula 5.

$$p(x_j) = F(w'), w' = \underset{w}{\operatorname{argmin}} \|G(x_j) - F(w)\| \quad \text{(Formula 5)}$$

Figure 6:
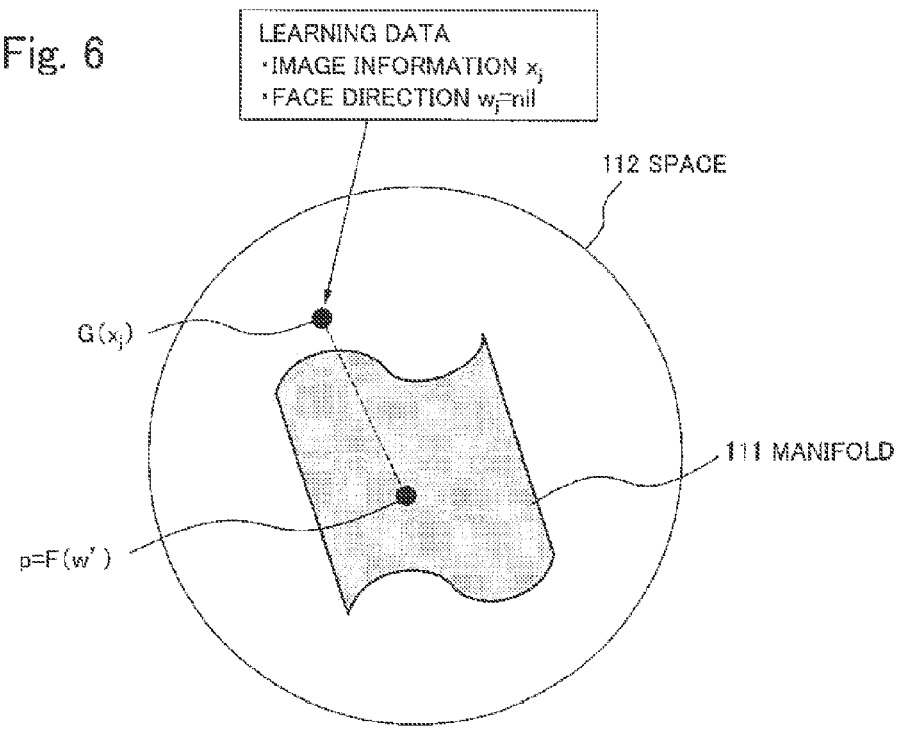

FIG. 6 is a diagram showing a method by which the manifold position estimation unit 105 estimates a position on the manifold 111 from learning data whose face direction is unknown. As shown in FIG. 6, the manifold position estimation unit 105 outputs position p calculated using Formula 5 as an estimated result of a face direction.

For example, yaw is considered as a face direction, and a case of a manifold expressed by definition of F of Formula 1 is considered. In this case, the manifold position estimation unit 105 calculates position p using Formula 6.

$$p(x_j) = \arctan \frac{\sum_{k=1}^{3} G_k(x_j)\cos(\alpha_k)}{\sum_{k=1}^{3} G_k(x_j)\sin(\alpha_k)} \quad \text{(Formula 6)}$$

The face information identification unit 106 identifies whether it is known or unknown whether it is a facial image or a non-facial image about data zj selected by the learning data selection unit 102, and outputs information on the identified result.

Specifically, the face information identification unit 106 may detect a numerical value of yj and judge that it is known whether it is a facial image or a non-face when yj=1 or yj=−1, and judge that it is unknown whether it is a facial image or a non-facial image when yj=0.

Or, for example, in the early stage of learning, the face information identification unit 106 may judge that it is known whether it is a facial image or non-face based on utilizing the facial detection technique described in non-patent document 1 and judging as yj=1 when detection can be performed and as yj=−1 when it can not be performed.

Both of the first parameter update quantity calculation unit 107 and the second parameter update quantity calculation unit 108 calculate an update quantity Δλ of a parameter so that an error of processing may be minimized when actually performing facial detection processing and face direction estimation processing.

The first parameter update quantity calculation unit 107 calculates update quantity Δλ of parameter λ of function G based on the result information that has been identified by the face information identification unit 106 as being known whether it is a facial image or a non-facial image. Specifically, the first parameter update quantity calculation unit 107 calculates the distance between the position p on the manifold 111 converted by the manifold position conversion unit 104 or estimated by the manifold position estimation unit 105 and the position of image information xj converted to vector vj by function G on the space 112 embedding the manifold 111. The first parameter update quantity calculation unit 107 calculates update quantity Δλ of parameter according to whether it is a facial image or is a non-facial image based on the calculated distance.

For example, as is the case with non-patent document 2, the first parameter update quantity calculation unit 107 sets an energy function E as Formula 7 using position p on the manifold 111 converted by the manifold position conversion unit 104 or estimated by the manifold position estimation unit 105 about data known that it is a facial image.

$$E(y_j=1)=\|G(x_j)-p\|^2 \quad \text{(Formula 7)}$$

Also, for example, the first parameter update quantity calculation unit 107 sets the energy function E as Formula 8 about data known that it is a non-facial image.

$$E(y_j=-1)=K\exp(-\|G(x_j)-p\|^2) \quad \text{(Formula 8)}$$

The first parameter update quantity calculation unit 107 calculates update quantity Δλ which makes the above-mentioned energy function E small using Formula 9.

$$\Delta\lambda = -\alpha \frac{\partial E}{\partial \lambda} \quad \text{(Formula 9)}$$

α is a minute number set in advance.

Figure 7:
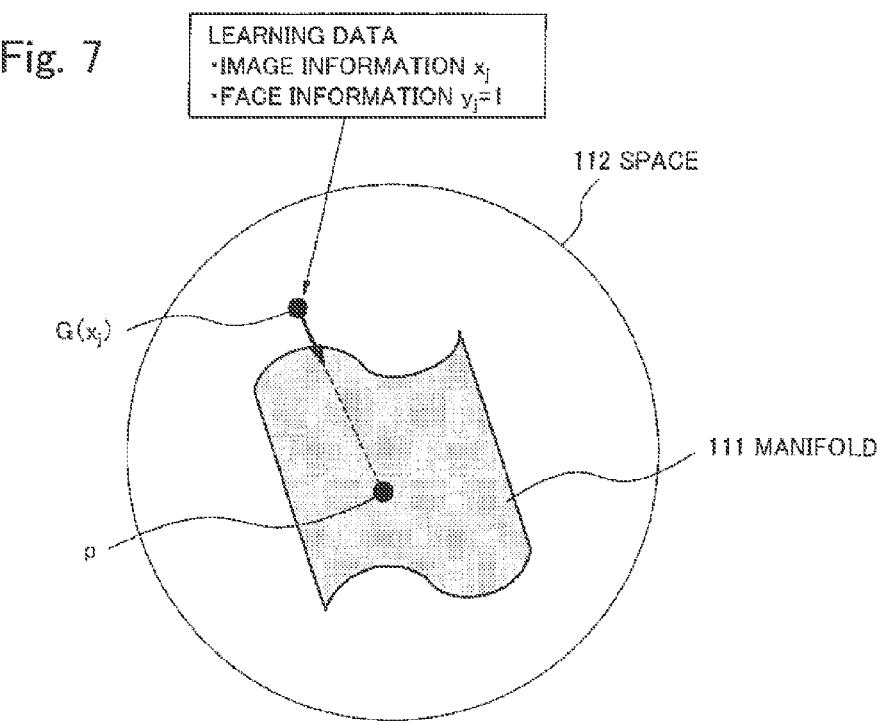
Figure 8:
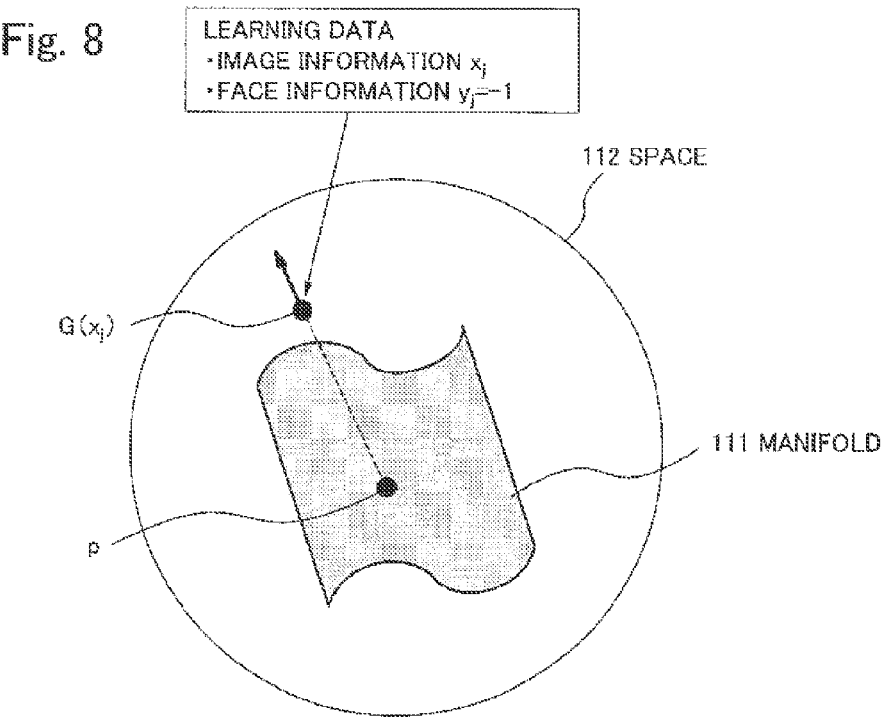

FIG. 7 is a diagram showing update of a face direction estimation parameter for learning data about which it is known that it is a facial image. FIG. 8 is a diagram showing update of a face direction estimation parameter for learning data about which it is known that it is a non-facial image.

As shown in FIG. 7, it can be said that, in the case of a facial image, making the above-mentioned energy function E small means calculating an update quantity so that function G (xj) may approach position p. And, as shown in FIG. 8, it can be said that, in the case of a non-facial image, making the above-mentioned energy function E small means calculating an update quantity so that function G (xj) may depart from position p.

The above-mentioned energy function changes the shape of the function between the case of a facial image and the case of a non-facial image. Accordingly, the first parameter update quantity calculation unit 107 may set the energy function E as Formula 10 instead of the above-mentioned energy function.

$$E(y_j)=K\exp[y_j(\|g(x_j)-p\|^2-T)] \quad \text{(Formula 10)}$$

T is an optional vector.

The second parameter update quantity calculation unit 108 calculates an update quantity of parameter λ of function G based on result information which has been identified by the face information identification unit 106 as being unknown whether it is a facial image or a non-facial image, that is, in case of yj=0. Specifically, the second parameter update quantity calculation unit 108 calculates an update quantity of the parameter such that, when the distance between a position on a manifold converted by the manifold position conversion unit 104 or estimated by the manifold position estimation unit 105 and a position of image xj on the space 112 embedding the manifold 111 is short, the distance is made shorter, and, when it is large, the distance is made larger.

For example, the energy function E may be set as Formula 11 to learning data for which it is unknown whether it is a facial image or a non-facial image, that is, learning data with yj=0 using the above-mentioned energy function E adopted when whether it is a facial image or a non-facial image is known in the first parameter update quantity calculation unit 107.

$$E(y_j=0)=\min(E(y_j=1),E(y_j=-1))$$ (Formula 11)

The second parameter update quantity calculation unit 108 calculates update quantity $\Delta\lambda$ of the parameter using Formula 9 so that the energy function E indicated in Formula 11 may be minimized.

Figure 9:
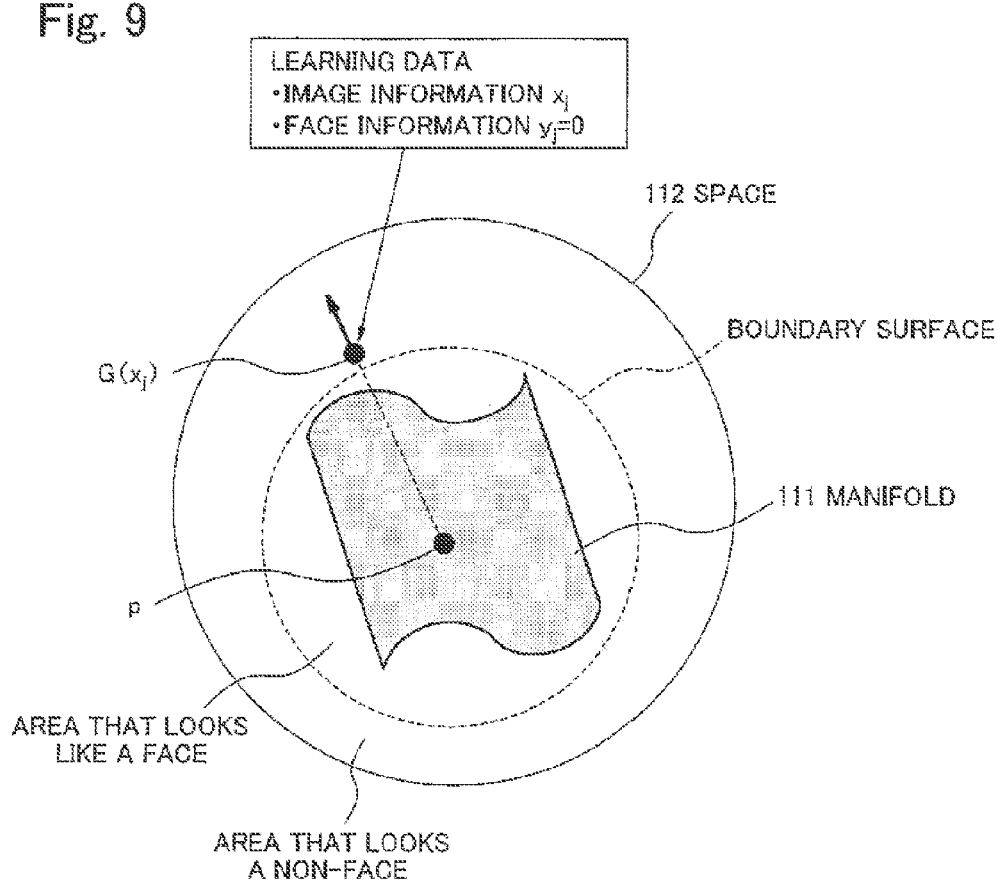

FIG. 9 is a diagram showing update of a face direction estimation parameter for learning data for which whether it is a facial image or a non-facial image is unknown. As shown in FIG. 9, it can be said that calculating a parameter update quantity using Formula 11 and Formula 12 means calculating it such that, when function G (xj) is near position p, it is made closer, and, when it is far from position p, it is made farther. As shown in FIG. 9, judgment of whether function G (xj) is near position p or far from it may be judged by setting a boundary surface using a threshold value, for example, and defining an area which seems to be a facial image and an area which seems to be a non-facial image.

The parameter update unit 109 updates parameter $\lambda$ to $\lambda+\Delta\lambda$ using update quantity $\Delta\lambda$ obtained by the first parameter update quantity calculation unit 107 or the second parameter update quantity calculation unit 108.

The result output unit 110 outputs parameter $\lambda$ updated by the parameter update unit 109 to a file or the like.

Figure 10:
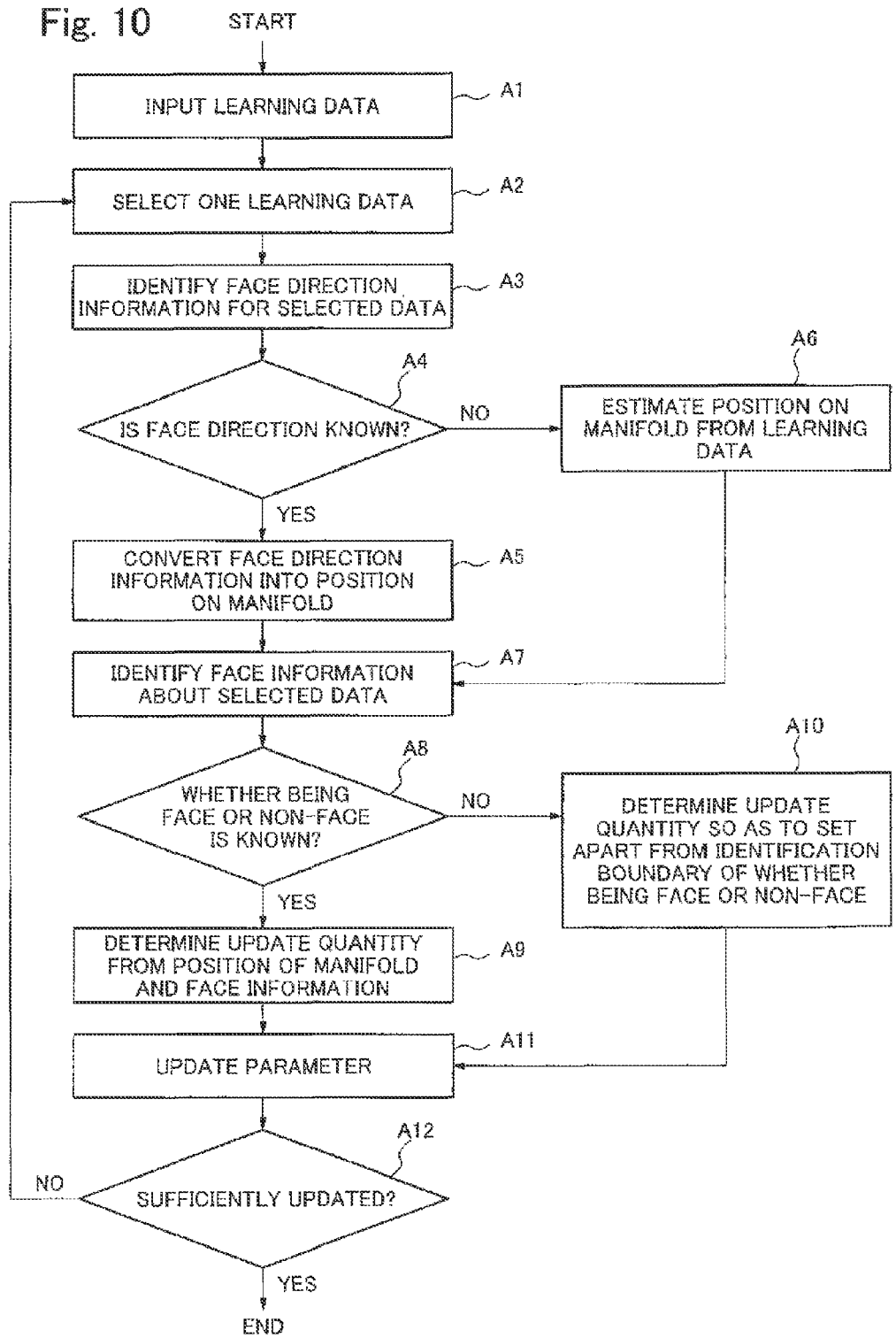

Next, operations of the first exemplary embodiment of the present invention will be described in detail with reference to FIG. 2 and FIG. 10. FIG. 10 is a flowchart showing operations of the first exemplary embodiment of the present invention.

First, the learning data input unit 101 inputs a learning data group constructed with N pieces of learning data zi (i=1 . . . N), and stores them (Step A1) based on operation performed by a user.

Next, the learning data selection unit 102 selects one piece of learning data zj to which the following processing will be performed from the learning data group inputted by the learning data input unit 101 (Step A2).

Next, it is identified in the face direction information identification unit 103 whether a face direction of learning data zj selected by the learning data selection unit 102 is known or unknown (Step A3).

When it is identified that a face direction is known, the face direction information identification unit 103 outputs learning data zj to the manifold position conversion unit 104. When it is identified that it is unknown, the face direction information identification unit 103 outputs learning data zj to the manifold position estimation unit 105 (Step A4).

Next, when it is identified in Step A4 that a face direction is known, that is, when wj is identified an appropriate numerical value which is not "nil", the manifold position conversion unit 104 converts face direction information wj into position p on the face direction manifold 111. (Step A5). On the other hand, when it is identified in Step A4 that a face direction is unknown, the manifold position estimation unit 105 estimates position p on the face direction manifold 111 using image xj of the learning data (Step A6). In both cases where the step moves to Step A5 and to Step A6, the image processing learning device 100 obtains location information p on the face direction manifold 111.

Next, the face information identification unit 106 receives input of learning data zj and location information p from the manifold position conversion unit 104 or the manifold position estimation unit 105, and identifies whether it is known or unknown whether it is a facial image or it is a non-facial image (Step A7).

When it is identified that whether it is a facial image or a non-facial image is known, the face information identification unit 106 outputs learning data zj and location information p to the first parameter update quantity calculation unit 107. When it is identified that it is unknown, the face information identification unit 106 outputs learning data zj and location information p to the second parameter update quantity calculation unit 109 (Step A8).

Next, when it is identified in Step A8 that whether it is a facial image or a non-facial image is known, the first parameter update quantity calculation unit 107 calculates the distance between function G (xj) corresponding to a position of image xj on the space 112 embedding the manifold 111 and position p on the manifold 111, and calculates an update quantity according to whether it is a facial image or a non-facial image (Step A9). On the other hand, when it is identified in the above-mentioned Step A8 that whether it is a facial image or a non-facial image is unknown, the second parameter update quantity calculation unit 109 calculates an update quantity of parameter $\lambda$ so that, when G (xj) is close to p, it may become closer to p, and, when it is far from p, it may become farther (Step A10).

Next, the parameter update unit 109 updates parameter $\lambda$ to $\lambda+\Delta\lambda$ (Step A11).

Moreover, the image processing device 109 judges whether the parameter has been updated sufficiently or not (Step A12), and, when it is judged that it is not updated sufficiently, it returns to Step A2 once again, and if not so, finishes processing. Specifically, the image processing device 109 may stop when the number of times of reaching Step A12 exceeds the number of times set in advance. Alternatively, the image processing device 109 may identify the size of an update quantity updated in Step A11, and stop when the size is less than a numerical value set in advance.

An image processing learning program in this exemplary embodiment should just be a program which makes a computer execute steps A1-A12 shown in FIG. 10, and be a program which is carried out the operations mentioned above.

As it has been described above, based on the image processing learning device 100 according to the first exemplary embodiment of the present invention, face direction estimation processing and facial detection processing can be learned simultaneously with a high degree of accuracy and without incurring a great deal of cost, even if all images prepared in advance are not simultaneously given face information and, if it is a facial image, information about which direction a face is facing.

The reason of this is that the image processing learning device 100 discriminates processing for learning according to presence or absence of face information and presence or absence of face direction information. It can learn parameter λ which can realize appropriate facial detection processing and face direction estimation processing based on discrimination of learning processing.

Second Exemplary Embodiment

The second exemplary embodiment of the present invention is an image processing device 200 which performs facial detection processing and face direction estimation processing using function G constructed with parameter λ learned by the image processing learning device 100 according to the first exemplary embodiment.

Figure 11:
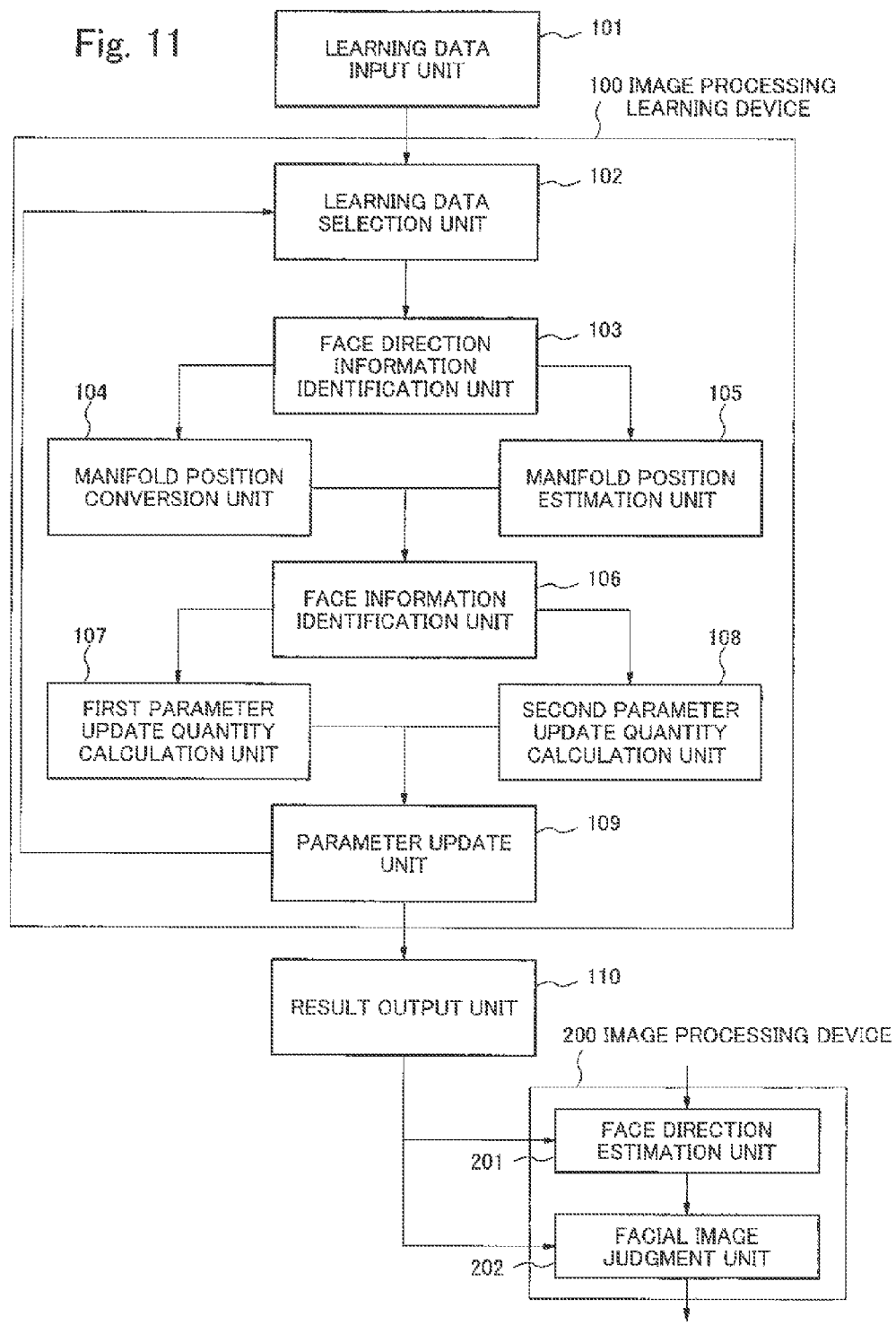

FIG. 11 is a block diagram showing a functional structure of an image processing device and an image processing learning device according to the second exemplary embodiment of the present invention. As shown in FIG. 11, the image processing device 200 is connected to the image processing learning device 100 via the result output unit 110. Description will be omitted about the image processing learning device 100 because it has the same structure as the first exemplary embodiment. The image processing device 200 includes a face direction estimation unit 201 and a facial image judgment unit 202.

The face direction estimation unit 201 estimates a face direction based on a position of an input image on a space including a manifold and a position of the input image on the manifold. An input image to be inputted may be a partial image extracted using a facial detection technique related to the present invention.

Specifically, the face direction estimation unit 201 identifies whether a face direction of the input image is known or unknown based on data uj from the result output unit 110 first. The face direction estimation unit 201 may estimate a face direction just like the face direction information identification unit 103 in the first exemplary embodiment. That is, referring to face direction information wj in object data uj (data using the same structure as learning data zj in the first exemplary embodiment), the face direction estimation unit 201 may identify whether nil is stored in wj or not, and judge that a face direction is known when one except for nil is stored. Further, in the case of yj=−1, because it is clear that xj is a non-facial image, the face direction information identification unit 103 may judge that a face direction is unknown without referring to wj.

When it is identified that a face direction is known, the face direction estimation unit 201 makes that known face direction be an estimated result. Further, the face direction estimation unit 201 may convert face direction information into a position on a manifold. For example, a position on a manifold may be converted using Formula 1, Formula 2, Formula 3 or the like. Or, the face direction estimation unit 201 may calculate a position of the input image on a space including a manifold using function G constructed with the parameter λ updated by the learning of the image processing learning device 100.

When it is identified that a face direction is unknown, the face direction estimation unit 201 calculates a position of the input image on the space including the manifold using function G constructed with the parameter λ updated by the learning of the image processing learning device 100. The face direction estimation unit 201 estimates a position on the manifold from the calculated position on the space, estimates a face direction calculated from the estimated position on the manifold, and outputs the result. For example, a position on a manifold may be estimated using Formula 5. A face direction may be calculated using Formula 1, Formula 2, Formula 3 or the like, for example.

The facial image judgment unit 202 determines whether it is a non-facial image or a facial image by the distance between the position of the input image on the space including the manifold and the position on the manifold by the face direction estimation unit 201.

Specifically, first, the facial image judgment unit 202 identifies whether it is known or unknown whether an input image is a facial image or a non-facial image. The facial image judgment unit 202 may perform judgment about a face or a non-face just like the face information identification unit 106 in the first exemplary embodiment. The facial image judgment unit 202 may detect a numerical value of face information yj in object data uj, judge that whether it is a facial image or a non-facial image is known in case of yj=1 or yj=−1, and judge that whether it is a facial image or a non-facial image is unknown in case of yj=0.

When it is determined that whether it is a facial image or a non-facial image is known, the facial image judgment unit 202 makes that known information be an estimated result.

When whether it is a facial image or a non-facial image is unknown, the facial image judgment unit 202 calculates a position of the input image on a space including a manifold using the function G constructed with the parameter λ updated by learning of the image processing learning device 100. When the position on the space has been already calculated by the face direction estimation unit 201, it may use that position.

Or, the facial image judgment unit 202 calculates a position of the input image on the manifold. For example, a position on the manifold may be calculated using Formula 1, Formula 2, Formula 3 or the like. When the position of the input image on the manifold has been already converted or estimated by the face direction estimation unit 201, it may use that position.

The facial image judgment unit 202 determines that the input image is a facial image when the distance between the position of the input image on the space including the manifold and the position of the input image on the manifold is smaller than a threshold value. The facial image judgment unit 202 determines that the input image is a non-facial image when the distance between the position of the input image on the space including the manifold and the position of the input image on the manifold is larger than the threshold value.

Figure 12:
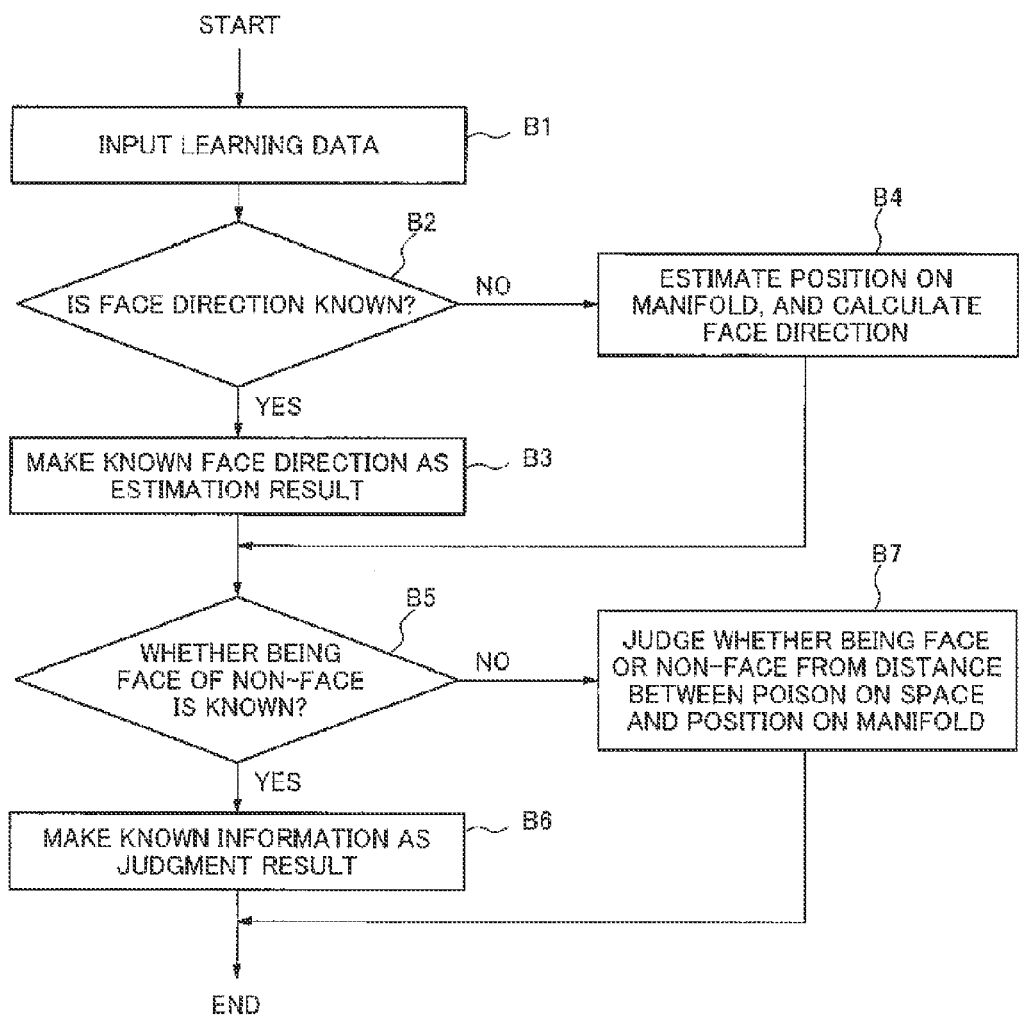

Next, with reference to FIG. 12, operations of the second exemplary embodiment of the present invention will be described in detail. FIG. 12 is a flowchart showing operations of the second exemplary embodiment of the present invention.

First, a user inputs object data to the face direction estimation unit 201. Or, a computer may input a partial image extracted in a facial detection technique related to the present invention (Step B1).

Next, the face direction estimation unit 201 identifies whether a face direction of the image of the inputted object data is known or unknown (Step B2).

When it is identified that a face direction is known, the face direction estimation unit 201 makes that known face direction be an estimated result (Step B3).

When it is identified that a face direction is unknown, the face direction estimation unit 202 estimates a position of the image of the object data on a manifold using processing mentioned above and calculates a face direction (Step B4).

Next, the facial image judgment unit 202 identifies whether it is known or unknown whether the image of the object data is a facial or a non-facial image (step B5).

When identifying whether it is a facial or a non-facial image is known, the facial image judgment unit 202 makes that known information be a judgment result (Step B6).

When identifying whether it is a facial or a non-facial image is unknown, the facial image judgment unit 202 determines that the image of the object data is a facial image if the distance between the position of the image of the object data on the space including the manifold and the position on the manifold is smaller than a threshold value. And, the facial image judgment unit 202 determines that it is a non-facial image if it is larger than the threshold value (Step B7).

An image processing program in this exemplary embodiment should just be a program which makes a computer execute steps B1-B6 shown in FIG. 12, and be a program which is carried out the operations mentioned above.

As has been described above, based on the image processing device 200 according to the present invention, by using function G constructed with the parameter λ updated by learning of the image processing learning device 100, facial detection processing and face direction estimation processing can be performed simultaneously and with a high degree of accuracy.

Example

Figure 13:
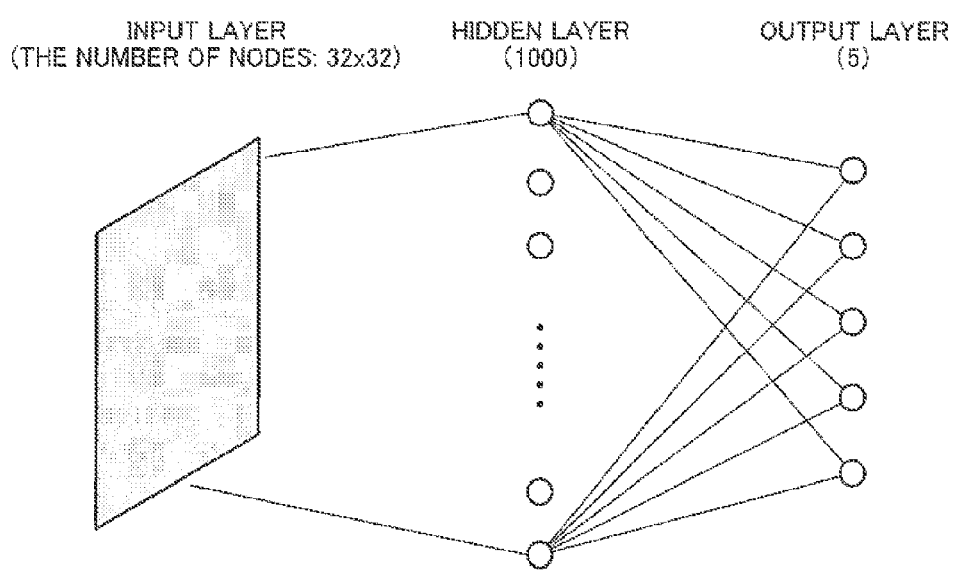

Next, a specific example of the first exemplary embodiment of the present invention will be described with reference to FIG. 10 and FIG. 13. FIG. 13 is a diagram showing an example of a neural network which converts an image into a manifold. As function G that realizes face direction estimation, a neural network of three layers which outputs an image consists of 32×32 pixels to five output layers via 1000 hidden layers as shown in FIG. 13 is adopted also referring to non-patent document 4.

First, a user sets all pieces of parameter λ for the neural network to 0 initially. And, the user prepares a data group for learning in advance.

A data group for learning to be prepared will be described in detail. First, the user photographs a lot of images including a face in advance using a digital camera. On this occasion, by fixing a position where a person to be an object of photographing stands and a position of the camera, the user performs photographing such that a face direction is kept constant. Then, for example, the user photographs a total of 100 images of 100 persons in one face direction.

Next, the user repeats changing the position where a person stands and a position of the camera in turn, and photographing of images of various face directions. By photographing 100 images for each of 10 face directions, for example, the user photographs total of 1000 images. In this case, because the user knows the positions where a person stands and the positions of a camera already, the user can acquire face direction information about all these images. For example, as face direction information, the user can calculate an angle from photographing conditions as face direction information which how many degrees of the left or the right is inclined when the front is 0 degree. In this example, it is supposed that an inclined angle which has been calculated and obtained from the photographing conditions is wi, and yaw is only thought as wi.

Next, the user stores a file of a photographed image group and face direction information transformed to a text form into a hard disk of a PC as an image. Then, to the image group, areas other than a face are eliminated and areas where a face shows are clipped by manpower using image processing software of the PC.

Because this processing requires a lot of manpower, for example, the user carries out processing of clipping a facial area part for 500 images among 1000 photographed images, and obtains a group of 500 facial images.

Next, the user expands or reduces the sizes of all facial images in the group to make them be 32 pixels of height and 32 pixels of width uniformly, converts into monochrome images and stores in the hard disk of the PC again. This image data is called learning data group A. Data belonging to the learning data group A is a facial image and its face direction information is known. That is, the learning data group A holds vector xi (i=1 . . . 500) of 32×32 dimensions consisting of 32 pixels in height and 32 pixels in width, corresponding face/non-face information yi=1 and face direction information wi that is not nil.

Next, the user clips a partial rectangular area in each of the images at random about the 500 remaining images which have not been used for the processing of clipping a facial area part among the 1000 photographed images. The user expands or reduces a clipped image into an image of 32 pixels in height and 32 pixels in width, and creates a group of 500 images in total. The user converts this image group into monochrome images and stores them in the hard disk of the PC again. This image data is called learning data group B. Data belonging to the learning data group B is unclear whether it is a facial image or not, but, if it is a facial image, its face direction is known. That is, the learning data group B holds vector xi (i=1 . . . 500) of 32×32 dimensions consisting of 32 pixels in height and 32 pixels in width, corresponding face/non-face information yi=nil and face direction information wi that is not nil.

Next, the user newly, for example, photographs 500 images of such as a landscape in which a person' face does not show up separately from the former image groups, and stores them in the hard disk of the PC. After that, the user clips a partial rectangular area in an image at random, expands or reduces it into an image of 32 pixels in height and 32 pixels in width, and creates a group of 500 images in total. The user converts the image group into monochrome images and stores in the hard disk of the PC again. This image data is called learning data group C. Data belonging to the learning data group C is known that it is a non-facial image. That is, the learning data group C holds vector xi (i=1 . . . 500) of 32×32 dimensions consisting of 32 pixels in height and 32 pixels in width, corresponding face/non-face information yi=−1 and face direction information wi in which nil is stored.

Next, the user collects, for example, 1000 images including a face from the internet and the like newly apart from the former image groups, and stores them in the hard disk of the PC. Then the user clips a facial area part from the collected images by manpower using image processing software of the PC.

Because this processing requires a lot of manpower, for example, the user carries out processing of clipping a facial area part to 500 images among 1000 photographed images, and obtains a group of 500 facial images.

Next, the user expands or reduces the sizes of all facial images in the group to make them be 32 pixels of height and 32 pixels of width uniformly, converts into a monochrome image and stores in the hard disk of the PC again. This image data is called learning data group D. Although data belonging to the learning data group D is known that it is a facial image, face direction information is unknown. That is, the learning data group D holds vector xi (i=1 . . . 500) of 32×32 dimensions consisting of 32 pixels in height and 32 pixels in width, corresponding face/non-face information yi=1 and face direction information wi in which nil is stored.

Next, the user clips a partial rectangular area in each of the images at random about the 500 remaining images which have not been used for the processing of clipping a facial area part among the 1000 images collected from the internet and the like. The user expands or reduces a clipped image into an image of 32 pixels in height and 32 pixels in width, and creates a group of 500 images in total. The user converts the image group into monochrome images and stores in the hard disk of the PC again. This image data is called learning data group E. Data belonging to the learning data group E is known whether it is a facial image or not, and, if it is a facial image, its face direction information is also unknown. That is, the learning data group E holds vector xi (i=1 . . . 500) of 32×32 dimensions consisting of 32 pixels in height and 32 pixels in width, corresponding face/non-face information yi=nil and face direction information wi in which nil is stored.

Based on operations by the user, the learning data input unit 101 inputs the learning data groups A to E in total of 2500 pieces of data in a lump as data groups for learning. That is, in Step A1 in the first exemplary embodiment, the learning data input unit 101 inputs the data groups for learning consisting of 2500 pieces (N=2500) of learning data zi.

Next, in Step A2, the learning data selection unit 102 selects one piece of data zj as learning data at random from the data groups for learning consisting 2500 pieces of data. For example, it is supposed that the learning data is data of j=120 (the 120th data among 2500 pieces of data).

Next, in Step A3, the face direction information identification unit 103 identifies whether zj has face direction information. When j is a numerical value from 1 to 1000, because zj belongs to the learning data group A or B, nil is not stored in wj, and the face direction information identification unit 103 detects that wj contains a numerical value indicating a face direction besides nil. Because j is j=120 in this time, the face direction information identification unit 103 identifies that zj is data whose face direction is known.

Next, the image processing learning device 100 moves to Step A4. However, because zj is identified that a face direction is known, the image processing learning device 100 moves to step A5.

Next, in step A5, the manifold position conversion unit 104 converts face direction information wj into a position on a face direction manifold.

In this example, it is supposed a manifold inside a 5 dimensional space as a face direction manifold. The manifold position conversion unit 104 converts the face direction information wj into point p=F (wj) within the 5 dimensional using Formula 12.

$$F_k(w_j) = \cos(\theta - \alpha_k), k = 1, 2, 3, 4, 5;$$ (Formula 12)

$$\alpha = \{-\frac{\pi}{2}, -\frac{\pi}{3}, 0, \frac{\pi}{3}, \frac{\pi}{2}\}$$

In this example, because yaw is only considered as face direction information wj, it is supposed that a size of yaw is θ.

Next, in Step A7, the face information identification unit 106 identifies face information of zj.

When j is a numerical value from 1 to 500 (it corresponds to the learning data group A) or from 1001 to 2000 (it corresponds to the learning data groups C and D), the face information identification unit 106 identifies that face information is held. Because learning data zj is data of j=120, the face information identification unit 106 identifies that zj holds face information. And, because of yi=1, the face information identification unit 106 identifies that zj is a facial image. The image processing learning device 100 moves to Step A10.

In Step A10, the first parameter update quantity calculation unit 107 determines an update quantity of parameter λ of function G which makes point p and point G (xj) approach each other by calculating as Formula 9 using Formula 10.

In Step A11, the parameter update unit 109 updates parameter λ to λ+Δλ.

In Step A12, the parameter update unit 109 judges whether updates of the parameter have been performed sufficiently. The parameter update unit 109 performs judgment that it terminates, if parameter λ has been updated 10000 times, for example. Because this time is the first time, it is not determined yet as an end, and the image processing learning device 100 returns to Step A2.

After that, similar processing is repeated, and, when parameter λ is updated 10000 times, processing ends.

Other Expressions of Exemplary Embodiments

In each of the above-mentioned exemplary embodiments, characteristic structures of the image processing learning device, the image processing learning method and the image processing learning program as shown below are indicated.

The image processing learning device in an embodiment of the present invention comprises: a face direction information identification unit which identifies whether a face direction being known or unknown about data selected from a learning data group; a manifold position conversion unit which converts information about a face direction into a position on a manifold, upon a face direction being identified as being known by the face direction information identification unit; a manifold position estimation unit which estimates which position on the manifold being a suitable position from a position on a space of converted image using a function of converting the image corresponding to the data into a position on the space embedding the manifold, upon a face direction being identified as being unknown by the face direction information identification unit; a face information identification unit which identifies whether being known or unknown whether the data being a facial image or a non-facial image; a first parameter update quantity calculation unit which calculates a distance between a position on a manifold converted by the manifold position conversion unit or estimated by the manifold position estimation unit and a position of the image on the space converted using the function, and calculates an update quantity of a parameter included in the function according to whether being a facial image or being a non-facial image based on the distance, upon being identified by the face information identification unit as being known whether being a facial image or being a non-facial image; a second parameter update quantity calculation unit which calculates an update quantity of the parameter in a manner, upon a distance between a position on a manifold converted by the manifold position conversion unit or estimated by the manifold position estimation unit and a position of the image on the space being short, further shortening the distance, and, upon the distance being large, further enlarging the distance, upon being identified by the face information identification unit as being unknown whether being a facial image or being a non-facial image; and a parameter update unit which updates the parameter using an update quantity calculated by the first parameter update quantity calculation unit or the second parameter update quantity calculation unit.

An image processing device in another exemplary embodiment of the present invention is an image processing device performing facial detection processing and face direction estimation processing using a function having a parameter updated based on learning of the image processing learning device, comprises: a face direction estimation unit which estimates a face direction based on a position of an input image on a space including a manifold and a position of an input image on the manifold, upon a face direction being unknown; and a facial image judgment unit which judges whether being a facial image or a non-facial image by a distance between a position of the input image on the space and a position of the input image on the manifold, upon being unknown whether being a facial image or a non-facial image.

An image processing learning method in an exemplary embodiment of the present invention: identifying whether a face direction being known or unknown about data selected from a learning data group; converting information about a face direction into a position on a manifold, upon a face direction being identified as being known; estimating which position on the manifold being a suitable position from a position on a space of converted image using a function of converting the image corresponding to the data into a position on the space embedding the manifold, upon a face direction being identified as being unknown; identifying whether being known or unknown whether the data being a facial image or a non-facial image; calculating a distance between a position on a manifold converted or estimated and a position of the image on the space converted using the function, and calculating an update quantity of a parameter included in the function according to whether being a facial image or being a non-facial image based on the distance, upon being identified as being known whether being a facial image or being a non-facial image; calculating an update quantity of the parameter in a manner, upon a distance between the converted or the estimated position on a manifold and a position of the image on the space being short, further shortening the distance, and, upon the distance being large, further enlarging the distance, upon being identified as being unknown whether being a facial image or being a non-facial image; and updating the parameter using the calculated update quantity.

An image processing method in another exemplary embodiment of the present invention is an image processing method of performing facial detection processing and face direction estimation processing using a function having a parameter updated based on learning of the image processing learning method, and: estimating a face direction based on a position of an input image on a space including a manifold and a position of an input image on the manifold, upon a face direction being unknown; and judging whether being a facial image or a non-facial image by a distance between a position of the input image on the space and a position of the input image on the manifold, upon being unknown whether being a facial image or a non-facial image.

An image processing learning program in an exemplary embodiment of the present invention makes a computer carry out processing of: identifying whether a face direction being known or unknown about data selected from a learning data group; converting information about a face direction into a position on a manifold, upon a face direction being identified as being known; estimating which position on the manifold being a suitable position from a position on a space of converted image using a function of converting the image corresponding to the data into a position on the space embedding the manifold, upon identifying a face direction as being unknown; identifying whether being known or unknown whether the data being a facial image or a non-facial image; calculating a distance between a position on a manifold converted or estimated and a position of the image on the space converted using the function, and calculating an update quantity of a parameter included in the function according to whether being a facial image or being a non-facial image based on the distance, upon being identified as being known whether being a facial image or being a non-facial image; calculating an update quantity of the parameter in a manner, upon a distance between the converted or the estimated position on a manifold and a position of the image on the space being short, further shortening the distance, and, upon the distance being large, further enlarging the distance, upon being identified as being unknown whether being a facial image or being a non-facial image; and updating the parameter using the calculated update quantity.

An image processing program in another exemplary embodiment of the present invention is an image processing program for making a computer carry out facial detection processing and face direction estimation processing using a function having a parameter updated based on learning of the image processing learning program, and makes the computer carry out processing of: estimating a face direction based on a position of an input image on the space including a manifold and a position of an input image on the manifold, upon a face direction being unknown; and judging whether being a facial image or a non-facial image by a distance between a position of the input image on the space and a position of the input image on the manifold upon being unknown whether being a facial image or a non-facial image.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-154914, filed on Jul. 7, 2010, the disclosure of which is incorporated herein in its entirety by reference.

DESCRIPTION OF SYMBOL

100 Image processing learning device
101 Learning data input unit
102 Learning data selection unit
103 Face direction information identification unit
104 Manifold position conversion unit
105 Manifold position estimation unit
106 Face information identification unit
107 First parameter update quantity calculation unit
108 Second parameter update quantity calculation unit
109 Parameter update unit
110 Result output unit
111 Manifold
112 Space
200 Image processing device
201 Face direction estimation unit
202 Facial image judgment unit
A Photographed image

The invention claimed is:
1. An image processing learning device, comprising:
a CPU,
a memory under control of the CPU, and
a program in the memory enabling the CPU to implement units including:
 a face direction information identification unit configured to identify whether a face direction being known or unknown about data selected from a learning data group;
 a manifold position conversion unit configured to convert information about a face direction into a position on a manifold, upon a face direction being identified as being known by said face direction information identification unit;

a manifold position estimation unit configured to estimate which position on said manifold being a suitable position from a position on a space of converted image using a function of converting said image corresponding to said data into a position on said space embedding said manifold, upon a face direction being identified as being unknown by said face direction information identification unit;

a face information identification unit configured to identify whether being known or unknown whether said data being a facial image or a non-facial image;

a first parameter update quantity calculation unit configured to calculate a distance between a position on a manifold converted by said manifold position conversion unit or estimated by said manifold position estimation unit and a position of said image on said space converted using said function, and to calculate an update quantity of a parameter included in said function according to whether being a facial image or being a non-facial image based on said distance, upon being identified by said face information identification unit as being known whether being a facial image or being a non-facial image;

a second parameter update quantity calculation unit configured to calculate an update quantity of said parameter in a manner, upon a distance between a position on a manifold converted by said manifold position conversion unit or estimated by said manifold position estimation unit and a position of said image on said space being short, further shortening said distance, and, upon said distance being large, to further enlarge said distance, upon being identified by said face information identification unit as being unknown whether being a facial image or being a non-facial image; and a parameter update unit configured to update said parameter using an update quantity calculated by said first parameter update quantity calculation unit or said second parameter update quantity calculation unit.

2. The image processing learning device according to claim 1, wherein
said manifold is embedded on a space obtained using a neural network in particular.

3. The image processing learning device according to claim 1, further comprising:
a learning data selection unit implemented via a CPU configured to select one piece of data from a learning data group, wherein,
in an early stage of learning, said learning data selection unit selects data which has a known face direction and for which whether being a facial image or a non-facial image is known by priority.

4. An image processing device performing facial detection processing and face direction estimation processing using said function having a parameter updated based on learning of the image processing learning device according to claim 1, comprising:
a face direction estimation unit configured to estimate a face direction based on a position of an input image on a space including a manifold and a position of an input image on said manifold, upon a face direction being unknown; and
a facial image judgment unit configured to judge whether being a facial image or a non-facial image by a distance between a position of said input image on said space and a position of said input image on said manifold, upon being unknown whether being a facial image or a non-facial image.

5. The image processing device according to claim 4, wherein
said face direction estimation unit
identifies whether a face direction of said input image is known or unknown, makes said face direction be an estimated result when identifying as being known, and estimates a position on said manifold from a position of said input image on said space calculated using said function and makes a face direction calculated from said estimated position on said manifold be an estimated result when identifying as being unknown, and
said facial image judgment unit
identifies whether being known or unknown whether being a facial image or a non-facial image, makes known information be a judgment result when identifying as being known, and judges that said input image is a facial image when a distance between a position of said input image on said space and a position of said input image on said manifold is smaller than a threshold value and judges that said input image is a non-facial image when it is larger than said threshold value, when identifying as being unknown.

6. The image processing device according to claim 5, wherein
said image processing device outputs a result of estimation of a face direction of said face direction estimation unit and a result of judgment of an image of said facial image judgment unit.

7. An image processing learning method, comprising:
identifying whether a face direction being known or unknown about data selected from a learning data group;
converting information about a face direction into a position on a manifold, upon a face direction being identified as being known;
estimating which position on said manifold being a suitable position from a position on a space of converted image using a function of converting said image corresponding to said data into a position on said space embedding said manifold, upon a face direction being identified as being unknown;
identifying whether being known or unknown whether said data being a facial image or a non-facial image;
calculating a distance between a position on a manifold converted or estimated and a position of said image on said space converted using said function, and calculating an update quantity of a parameter included in said function according to whether being a facial image or being a non-facial image based on said distance, upon being identified as being known whether being a facial image or being a non-facial image;
calculating an update quantity of said parameter in a manner, upon a distance between said converted or said estimated position on a manifold and a position of said image on said space being short, further shortening said distance, and, upon said distance being large, further enlarging said distance, upon being identified as said being unknown whether being a facial image or being a non-facial image; and
updating said parameter using said calculated update quantity;
wherein the method is performed using a processor or a computer.

8. An image processing method of performing facial detection processing and face direction estimation processing using said function having a parameter updated based on learning of the image processing learning method according to claim 7, comprising:
  estimating a face direction based on a position of an input image on a space including a manifold and a position of an input image on said manifold, upon a face direction being unknown; and
  judging whether being a facial image or a non-facial image by a distance between a position of said input image on said space and a position of said input image on said manifold, upon being unknown whether being a facial image or a non-facial image.

9. A non-transitory computer readable medium embodying a program, said program causing an image processing learning device to perform a method, said method comprising:
  identifying whether a face direction being known or unknown about data selected from a learning data group;
  converting information about a face direction into a position on a manifold, upon a face direction being identified as being known;
  estimating which position on said manifold being a suitable position from a position on a space of converted image using a function of converting said image corresponding to said data into a position on said space embedding said manifold, upon identifying a face direction as being unknown;
  identifying whether being known or unknown whether said data being a facial image or a non-facial image;
  calculating a distance between a position on a manifold converted or estimated and a position of said image on said space converted using said function, and calculating an update quantity of a parameter included in said function according to whether being a facial image or being a non-facial image based on said distance, upon being identified as being known whether being a facial image or being a non-facial image;
  calculating an update quantity of said parameter in a manner, upon a distance between said converted or said estimated position on a manifold and a position of said image on said space being short, further shortening said distance, and, upon said distance being large, further enlarging said distance, upon being identified as being unknown whether being a facial image or being a non-facial image; and
  updating said parameter using said calculated update quantity.

10. A non-transitory computer readable medium embodying a program for facial detection processing and face direction estimation processing using said function having a parameter updated based on the program according to claim 9, said program causing an image processing device to perform a method, said method comprising:
  estimating a face direction based on a position of an input image on said space including a manifold and a position of an input image on said manifold, upon a face direction being unknown; and
  judging whether being a facial image or a non-facial image by a distance between a position of said input image on said space and a position of said input image on said manifold, upon being unknown whether being a facial image or a non-facial image.

11. An image processing learning device, comprising:
  a face direction information identification means for identifying whether a face direction being known or unknown about data selected from a learning data group;
  a manifold position conversion means for converting information about a face direction into a position on a manifold, upon a face direction being identified as being known by said face direction information identification means;
  a manifold position estimation means for estimating which position on said manifold being a suitable position from a position on a space of converted image using a function of converting said image corresponding to said data into a position on said space embedding said manifold, upon a face direction being identified as being unknown by said face direction information identification means;
  a face information identification means for identifying whether being known or unknown whether said data being a facial image or a non-facial image;
  a first parameter update quantity calculation means for calculating a distance between a position on a manifold converted by said manifold position conversion means or estimated by said manifold position estimation means and a position of said image on said space converted using said function, and calculating an update quantity of a parameter included in said function according to whether being a facial image or being a non-facial image based on said distance, upon being identified by said face information identification means as being known whether being a facial image or being a non-facial image;
  a second parameter update quantity calculation means for calculating an update quantity of said parameter in a manner, upon a distance between a position on a manifold converted by said manifold position conversion means or estimated by said manifold position estimation means and a position of said image on said space being short, further shortening said distance, and, upon said distance being large, further enlarging said distance, upon being identified by said face information identification means as being unknown whether being a facial image or being a non-facial image; and
  a parameter update means for updating said parameter using an update quantity calculated by said first parameter update quantity calculation means or said second parameter update quantity calculation means.

* * * * *

UNITED STATES PATENT AND TRADEMARK OFFICE
CERTIFICATE OF CORRECTION

PATENT NO.         : 8,971,613 B2
APPLICATION NO.    : 13/808511
DATED              : March 3, 2015
INVENTOR(S)        : Hiroyoshi Miyano Page 1 of 1

It is certified that error appears in the above-identified patent and that said Letters Patent is hereby corrected as shown below:

In the specification

Column 10, Line 19: After "parameter" insert -- λ --

Signed and Sealed this
Seventeenth Day of November, 2015

Michelle K. Lee
*Director of the United States Patent and Trademark Office*